United States Patent
Sun

(10) Patent No.: US 11,860,270 B2
(45) Date of Patent: Jan. 2, 2024

(54) SPARSE LINEAR ARRAY APPROACH IN AUTOMOTIVE RADARS USING MATRIX COMPLETION

(71) Applicant: THE BOARD OF TRUSTEES OF THE UNIVERSITY OF ALABAMA, Tuscaloosa, AL (US)

(72) Inventor: Shunqiao Sun, Northport, AL (US)

(73) Assignee: The Board of Trustees of The University of Alabama, Tuscaloosa, AL (US)

(*) Notice: Subject to any disclaimer, the term of this patent is extended or adjusted under 35 U.S.C. 154(b) by 291 days.

(21) Appl. No.: 17/208,097

(22) Filed: Mar. 22, 2021

(65) Prior Publication Data

US 2021/0311182 A1    Oct. 7, 2021

Related U.S. Application Data

(60) Provisional application No. 63/003,321, filed on Apr. 1, 2020.

(51) Int. Cl.
    *G01S 13/90*     (2006.01)
    *G01S 13/931*    (2020.01)
    *G01S 7/35*      (2006.01)

(52) U.S. Cl.
    CPC ...... *G01S 13/9089* (2019.05); *G01S 13/9021* (2019.05); *G01S 13/931* (2013.01); *G01S 7/356* (2021.05); *G01S 13/9011* (2013.01); *G01S 13/9029* (2013.01)

(58) Field of Classification Search
    CPC .......... G01S 13/9089; G01S 13/9021; G01S 13/931; G01S 7/356; G01S 13/9011; G01S 13/9029; H01Q 21/00; H01Q 21/22; H04B 7/0413; H04B 7/0417
    See application file for complete search history.

(56) References Cited

U.S. PATENT DOCUMENTS

| | | | |
|---|---|---|---|
| 9,541,639 B2 | 1/2017 | Searcy et al. | |
| 9,664,775 B2 | 5/2017 | Alcalde | |
| 9,869,762 B1 | 1/2018 | Alland et al. | |
| 9,903,946 B2 | 2/2018 | Willey et al. | |
| 11,269,049 B2 * | 3/2022 | Wu | G01S 13/42 |

(Continued)

OTHER PUBLICATIONS

Shunqiao, Sun, et al. "MIMO-MC Radar: A MIMO Radar Approach Based on Matrix Completion", IEEE Transactions on Aerospace and Electronic Systems, vol. 51, No. 3, Jul. 2015, pp. 1839-1851 (Year: 2015).*

(Continued)

*Primary Examiner* — Peter M Bythrow
(74) *Attorney, Agent, or Firm* — Meunier Carlin & Curfman LLC

(57) ABSTRACT

In an embodiment, a method for completing measurements for a uniform linear array from measurements from a sparse linear array is provided. The method includes: receiving a first set of measurements for a sparse linear array by a computing device; generating a second set of measurements for a uniform linear array from the first set of measurements by the computing device; and using matrix completion to determine values for a plurality of missing elements of the generated second set of measurements for the uniform linear array by the computing device.

15 Claims, 7 Drawing Sheets

(56) References Cited

U.S. PATENT DOCUMENTS

| | | | |
|---|---|---|---|
| 11,520,030 B2* | 12/2022 | Wu | G01S 13/325 |
| 2009/0085800 A1 | 4/2009 | Alland et al. | |
| 2011/0074621 A1 | 3/2011 | Wintermantel | |
| 2014/0347211 A1 | 11/2014 | Schoor et al. | |
| 2015/0253419 A1 | 9/2015 | Alland | |
| 2017/0315221 A1* | 11/2017 | Cohen | G01S 13/42 |
| 2018/0267555 A1* | 9/2018 | Li | H01Q 1/3283 |
| 2021/0041557 A1* | 2/2021 | Lei | G06F 17/142 |

OTHER PUBLICATIONS

J. Li and P. Stoica, "MIMO radar with colocated antennas," IEEE Signal Process. Mag., vol. 24, No. 5, pp. 106-114, 2007.

I. Bilik and et al., "Automotive MIMO radar for urban environments," in Proc. IEEE Radar Conference, Philadelphia, PA, May 2016.

C. Schmid, R. Feger, C. Wagner, and A. Stelzer, "Design of a linear non-uniform antenna array for a 77-GHz MIMO FMCW radar," in Proc. IEEE MTT-S International Microwave Workshop on Wireless Sensing, Local Positioning, and RFID, Cavtat, Croatia, Sep. 2009.

R. Feger, C. Wagner, S. Schuster, S. Scheiblhofer, H. Jager, and A. Stelzer, "A 77-GHz FMCW MIMO radar based on an SiGe single chip transceiver," IEEE Trans. Microw. Theory Tech., vol. 57, No. 5, pp. 1020-1035, 2009.

N. Jin and Y. Rahmat-Samii, "Advances in particle swarm optimization for antenna designs: Real-number, binary, singleobjective and multiobjective implementations," IEEE Trans. Antennas Propag., vol. 55, No. 3, pp. 556-567, 2007.

Y. Yu, A. P. Petropulu, and H. V. Poor, "MIMO radar using compressive sampling," IEEE J. Sel. Topics Signal Process., vol. 4, No. 1, pp. 146-163, 2010.

Y. Yu, S. Sun, R. N. Madan, and A. P. Petropulu, "Power allocation and waveform design for the compressive sensing based MIMO radar," IEEE Trans. Aerosp. Electron. Syst., vol. 50, No. 2, pp. 898-909, 2014.

Y. Chi, L. L. Scharf, A. Pezeshki, and A. R. Calderbank, "Sensitivity to basis mismatch in compressed sensing," IEEE Trans. Signal Process., vol. 59, No. 5, pp. 2182-2195, 2011.

T. Spreng and et al., "Wideband 120 GHz to 140 GHz MIMO radar: System design and imaging results," in Proc. European Microwave Conference (EuMC), Paris, France, Sep. 2015.

E. J. Cand`es and B. Recht, "Exact matrix completion via convex optimization," Foundations of Computational Mathematics, vol. 9, No. 6, pp. 717-772, 2009.

E. J. Can`es and T. Tao, "The power of convex relaxation: Near-optimal matrix completion," IEEE Trans. Inf. Theory, vol. 56, No. 5, pp. 2053-2080, 2010.

Y. Hua and T. K. Sarkar, "Matrix pencil method for estimating parameters of exponentially damped/undamped sinusoids in noise," IEEE Trans. Acoust., Speech, Signal Process., vol. 38, No. 5, pp. 814-824, 1990.

F. Kir´aly and R. Tomioka, "A combinatorial algebraic approach for the identifiability of low-rank matrix completion," in Proc. 29th Intl. Conference on Machine Learning (ICML), Edinburgh, Scotland, UK, Jun. 2012.

S. Sun, A. P. Petropulu, and H. V. Poor, "MIMO radar for ADAS and autonomous driving: Advantages and challenges," IEEE Signal Process. Mag., under review, 2019.

Texas Instruments, "AWR1243 single-chip 77- and 79-GHz FMCW transceiver," datasheet, 2017, revised Apr. 2020.

A. Ganis and et al., "A portable 3-D imaging FMCW MIMO radar demonstrator with a 24×24 antenna array for medium-range applications," IEEE Trans. Geosci. Remote Sens., vol. 56, No. 1, pp. 298-312, 2018.

J. Ying, J. F. Cai, D. Guo, G. Tang, Z. Chen, and X. Qu, "Vandermonde factorization of Hankel matrix for complex exponential signal recovery—application in fast NMR spectroscopy," IEEE Trans. Signal Process., vol. 66, No. 21, pp. 5520-5533, 2018.

S. Sun and A. P. Petropulu, "Waveform design for MIMO radars with matrix completion," IEEE J. Sel. Topics Signal Process., vol. 9, No. 8, pp. 1400-1411, 2015.

D. S. Kalogerias and A. P. Petropulu, "Matrix completion in colocated MIMO radar: Recoverability, bounds & theoretical guarantees," IEEE Trans. Signal Process., vol. 62, No. 2, pp. 309-321, 2014.

S. Bhojanapalli and P. Jain, "Universal matrix completion," in Proc. 31st Intl. Conference on Machine Learning (ICML), Beijing, China, Jun. 2014.

J. F. Cai, E. J. Cand`es, and Z. Shen, "A singular value thresholding algorithm for matrix completion," Siam J. Optim., vol. 20, No. 2, pp. 1956-1982, 2010.

T. Shan, M. Wax, and T. Kailath, "On spatial smoothing for direction-of-arrival estimation of coherent signals," IEEE Trans. Acoust., Speech, Signal Process., vol. 33, No. 4, pp. 506-811, 1985.

* cited by examiner

SPARSE LINEAR ARRAY APPROACH IN AUTOMOTIVE RADARS USING MATRIX COMPLETION

CROSS-REFERENCE TO RELATED APPLICATIONS

This application claims priority to U.S. Provisional Patent Application No. 63/003,321, entitled "A SPARSE LINEAR ARRAY APPROACH IN AUTOMOTIVE RADARS USING MATRIX COMPLETION" and filed on Apr. 1, 2020. The disclosure of which is incorporated by reference in its entirety.

BACKGROUND

Automotive radars for advanced driver assistance systems (ADAS) and autonomous driving are required to have high angle discrimination capability and small package size so that they can be easily integrated into vehicles. Unlike conventional phase arrays whose resolution is proportional to their size, multi-input multioutput (MIMO) radar can meet both high resolution and small size requirements. This is because MIMO radar can synthesize virtual arrays with large apertures using only a small number of transmit and receive antennas. This advantage has been exploited by almost all major automotive Tier 1 suppliers in their different types of radar products.

Even with the help of MIMO radar technology, however, the cost of synthesizing a large virtual ULA with half wavelength element spacing can be very high. One way to further reduce the cost without sacrificing angle resolution is to use virtual sparse linear arrays (SLAB), e.g., use a thinned receive ULA. SLA technology thus has been attracting great interest in automotive radar applications.

The idea of SLA is to use a MIMO radar but properly deploy the reduced number of transmit and receive antennas such that the element spacing of the corresponding virtual array is larger than half wavelength, while its aperture is the same as that of a ULA with half wavelength element spacing. The array response of the SLA has missing elements when compared to that of a ULA with the same aperture.

However, the irregular spacing of the array elements in SLA introduces grating lobes, which may cause angle ambiguity. Therefore, a key problem in SLA is the selection of the locations of the array elements so that the peak sidelobe level (PSL) of the virtual SLA beampattern is low. As there is no analytical solution to determining the antenna locations that achieve a minimum PSL for a given number of antennas, optimal sparse array design has been conducted based on global optimization techniques, such as particle swarm optimization. If the grating lobes of SLAs are low, angle finding can be done via compressive sensing (CS) and sparse signal recovery ideas; this requires discretizing the whole field of view into a fine grid.

However, CS suffers from off-grid issues and signal-to-noise ratio (SNR) loss due to the sparse sampling. On the other hand, interpolation or extrapolation techniques have been widely adopted in automotive radars to fill the holes in the synthesized SLA before applying digital beamforming for angle finding. However, it is difficult to interpolate or extrapolate the holes when the SLAs are irregular, or the number of holes is large.

SUMMARY

In this application is disclosed a method for completing the corresponding virtual ULAs. Instead of filling the holes of SLAs via interpolation, matrix completion techniques are used to complete the corresponding virtual ULAs. A Hankel matrix is constructed by subarrays of the virtual ULA that has a low rank structure. The Hankel matrix corresponding to a virtual SLA can be viewed as a spatially sampled version of the Hankel ULA matrix, and has missing elements. Under certain conditions, the Hankel matrix can be completed based on the SLA measurements. Once the Hankel matrix is completed, the elements in the virtual ULA can be recovered and high-resolution angle finding may be carried out via a matrix pencil method, or other subspace-based methods, such as ESPRIT and MUSIC.

The identifiability of the matrix completion problem may depend on the locations of the observed entries of a matrix. Once the problem is identifiable, conditions for matrix completion with high probability using nuclear-norm minimization depend on the coherence properties of the matrix. The coherence properties may be derived from the Hankel matrix, and SLA topologies may lead to an identifiable matrix completion problem. Here, the proposed method uses two SLA topologies to examine the recoverability of low rank Hankel matrix. One irregular SLA can be completed, while the Hankel matrix corresponding to uniform element spacing that is larger than half wavelength is not recoverable. The proposed method avoids the off-grid issue, which is inherent in compressive sensing methods. In addition, the proposed method avoids loss of SNR in the array response since the response of all the virtual array elements are recovered.

In an embodiment, a method for completing measurements for a uniform linear array from measurements from a sparse linear array is provided. The method includes: receiving a first set of measurements for a sparse linear array by a computing device; generating a second set of measurements for a uniform linear array from the first set of measurements by the computing device, wherein the second set of measurements has a plurality of missing elements; and using matrix completion to determine values for the plurality of missing elements of the generated second set of measurements for the uniform linear array by the computing device.

Embodiments may include some or all of the following features. The method may further include estimating a target angle using the generated second set of measurements. The method may include providing the estimated target angle to a vehicle navigation system. The second set of measurements may have more measurements than the first set of measurements. The first set of measurements may be received from a MIMO radar. The MIMO radar may be associated with a vehicle. Using matrix completion may include completing a Hankel matrix using the first set of measurements.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

System Model

Frequency-modulated continuous-wave (FMCW) waveforms are popular in automotive radar as they enable high resolution target range and velocity estimation while requiring low cost samplers at the receive antennas. An FMCW waveform is a chirp signal and is transmitted periodically with a certain repetition interval. The target echo is mixed with the transmitted chirp, which results in a complex sinusoid, known as beat signal. The frequency of the beat signal is the sum of the range frequency and the Doppler frequency, each containing information about the target range and Doppler. Estimation of the beat frequency is implemented in the digital domain with two fast Fourier transforms (FFTs), i.e., a range FFT (taken on samples obtained within the waveform repetition interval) followed by a Doppler FFT (taken on samples across repetition intervals), after sampling the beat signal with a low-speed analog-to-digital converter (ADC) (hence it's low cost). The targets are first separated in range and Doppler domains. As a result, the number of targets in the same range Doppler bin is typically small, which enables angle finding with sparse sensing techniques, such as compressive sensing.

A typical automotive radar transceiver, such as the AWR1243 of Texas Instruments, has $M_t=3$ and $M_r=4$ antennas. Depending on performance requirement and cost, automotive radar can use one or multiple transceivers to synthesize an SLA for angle finding.

Figure 1:
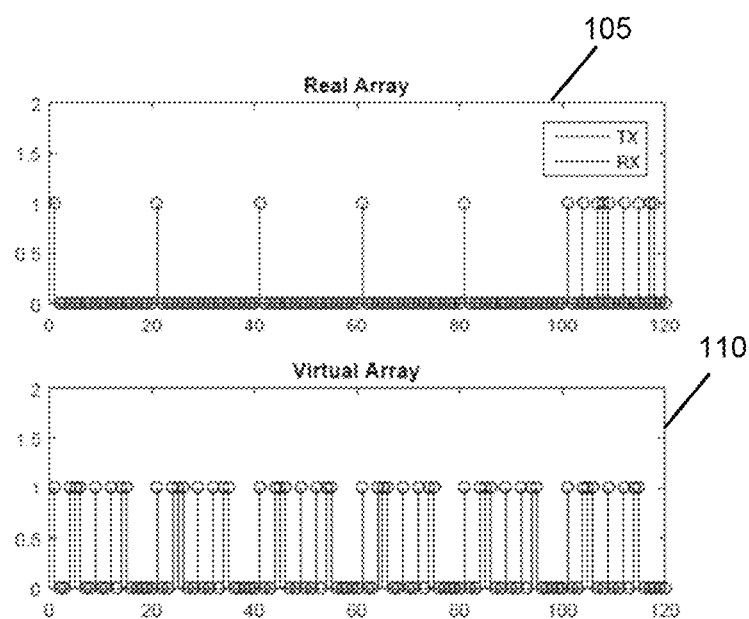
FIG. 1 is an illustration of a graph 105 from of a real array of an automotive radar cascaded with two transceivers and a graph 110 of a corresponding virtual array with 48 elements.

FIG. 1 an illustration of a graph 105 of the real array configuration of an automotive radar which is a cascaded of 2 transceivers, where all transmit and receive antennas are clock synchronized. Let $\lambda$ denote the wavelength of carrier frequency. In this example, $M_t=6$ transmit antennas are deployed with uniform spacing of $10\lambda$, while $M_r=8$ receive antennas are randomly deployed on discretized grid points in an interval of length equal to $10\lambda$. The interval is discretized uniformly with spacing of half wavelength. The transmit antennas transmit FMCW waveform in a way that at each receive antenna the contribution of each transmit antenna can be separated. The latter can be achieved using time domain multiplexing (TDM), or Doppler domain multiplexing (DDM), which effectively introduce waveform orthogonality among the transmitted waveforms. Therefore, with MIMO radar technology, a virtual SLA with 48 array elements and aperture of $57\lambda$ has been synthesized, as shown in the graph 110 of FIG. 1.

Compared to a ULA with half wavelength spacing and the same aperture, some elements at certain locations of the above virtual SLA are "missing" (denoted by zero values in the graph 110 of FIG. 1). However, the SLA approach uses a reduced number of transmit and receive antennas, which saves hardware cost. In addition, SLA helps in reducing the mutual coupling between antenna elements, and thus improves the array calibration performance.

The array response at a particular time instance consisting of data obtained at all the $M_tM_r$ virtual receivers and corresponding to the same range-Doppler bin is defined as the array snapshot. The SNR in the array snapshot is much higher than that in the beat signal, since energy has been accumulated in both range and Doppler domains via the two FFTs. For example, a range FFT of length $N_R$ combined with a Doppler FFT of length $N_D$ can provide total 10 $\log_{10}$ $(N_RN_D)$ dB SNR improvement. The high SNR in the array snapshot reduces the DOA estimation error.

A Novel Sparse Linear Array Approach

Suppose an array snapshot contains K targets with direction of arrivals (DOAs) $\theta_k$, $k=1, \ldots, K$. Without noise, the SLA response can be written as:

$$y_S = A_S s \qquad (1)$$

where $A_S=[a_S(\theta_1), \ldots, a_S(\theta_K)]$ is the steering matrix with $$a_S(\theta_k) = \left[1, e^{j\frac{2\pi}{\lambda}d\sin(\theta^k)}, \ldots, e^{j\frac{2\pi}{\lambda}dM_tM_{r-1}\sin(\theta^k)}\right]^T$$

and $d_i$ is the spacing of the −ith element of the SLA to its reference element. Here, $s=[\beta_1, \ldots, \beta_K]^T$, where $\beta_k$ denotes the amplitude associated with the k-th target.

The corresponding virtual ULA with $M=M_tM_r$ array elements and element spacing $d=\lambda/2$ has array response:

$$y = As \qquad (2)$$

where $A=[a(\theta_1), \ldots, a(\theta_K)]$ is the array steering matrix with:

$$a(\theta_k) = \left[1, e^{j\frac{2\pi}{\lambda}d\sin(\theta^k)}, \ldots, e^{j\frac{2\pi}{\lambda}d(M-1)\sin(\theta^k)}\right]^T$$

When $M=2N-1$, $y \in \mathbb{C}^{2N-1}$ can be divided into N overlapped subarrays of length N. Based on those subarrays, a square Hankel matrix $Y \in \mathbb{C}^{N \times N}$ with $Y_{ij}=y_{i+j-1}$ for $i=1, \ldots, N$ and $j=1, \ldots, N$ (our approach works in non-square case) may be formulated. The Hankel matrix Y has a Vandermonde factorization, shown below:

$$Y = B\Sigma B^T \qquad (3)$$

where $B=[b(\theta_1), \ldots, b(\theta_k)]$ is the subarray steering matrix with $$b(\theta_k) = \left[1, e^{j\frac{2\pi}{\lambda}d\sin(\theta^k)}, \ldots, e^{j\frac{2\pi}{\lambda}d(N-1)\sin(\theta^k)}\right]^T$$

and $\Sigma=\text{diag}(\tau_1, \ldots, \beta_k)$ is a diagonal matrix. Thus, the rank of Hankel matrix Y is K if $N>K$.

The Hankel matrix corresponding to an SLA configuration can be viewed as a subsampled version of Y. However, under certain conditions, the missing elements can be fully recovered by solving a relaxed nuclear norm optimization problem conditioned on the observed entries:

$$\min\|X\|_* \; s.t. \; X_{ij}=Y_{ij}, (i,j)\in\Omega \tag{4}$$

where $\Omega$ is the set of indices of observed entries that is determined by the SLA.

Once the matrix Y is recovered, the full array response is obtained by averaging its anti-diagonal entries. DOAs can be estimated via standard array processing methods based on the array response corresponding to the completed Y.

The conditions of matrix completion are related to the bounds on the coherence of Y, and also the placement of the sampling entries.

Coherence Properties of Hankel Matrix

Let U and V be left and right subspaces of the singular value decomposition (SVD) of $Y \in \mathbb{C}^{N \times N}$, which has rank K. The coherence of U (similarly for V) equals:

$$\mu(U) = \frac{N}{K} \max_{1 \leq i \leq N} \|U(i,:)\|^2 \in \left[1, \frac{N}{K}\right], \tag{5}$$

The matrix Y has coherence with parameters $\mu_0$ and $\mu_1$ if (A0) $\max(\mu(U), \mu(V)) \leq \mu_0$ for some positive $\mu_0$. (A1) The maximum element of matrix $\Sigma_{1 \leq i \leq k} u_i v_i^H$ is bounded by $$\frac{\mu_1 \sqrt{K}}{N}$$

in absolute value for some positive $\mu_1$.

It was shown that if entries of matrix Y are observed uniformly at random, and there are constants C,c such that if $|\Omega| \geq C \max(\mu_1^2, \mu_0^{1/2}\mu_1, \mu_0 N^{1/4}) \eta KN \log N$ for some $\eta>2$, the minimizer to problem (4) is unique and equal to Y with probability of $1-cN^{-\eta}$. Therefore, if matrix Y has a low coherence parameter, it can be completed using a smaller number of observed entries.

The following Theorem relates the coherence of Hankel matrix Y to the relative location of targets to each other, number of targets and N.

Theorem 1: (Coherence of Hankel Matrix Y): Consider the Hankel matrix Y constructed from a uniform linear array as presented in Section III and assume the set of target angles $\{\theta_k\}_{k \in N_K^+}$ consists of almost surely distinct members, with minimal spatial frequency separation $$K \leq \sqrt{\frac{N}{\beta_N(\xi)}}$$

satisfying $|X| \geq \xi \neq 0$. If $$x = \min_{(i,j) \in N_K^+ \times N_K^+, i \neq j} \frac{d}{\lambda} \sin(\theta_i - \sin\theta_j)$$

where $$\beta_N(\xi) = \frac{1}{N} \frac{\sin^2(\pi N \xi)}{\sin^2(\pi \xi)}$$

is the Fejer kernel, the matrix Y satisfies the conditions (A0) and (A1) with coherence $$\mu_0 \triangleq \frac{\sqrt{N}}{\sqrt{N} - (K-1)\sqrt{\beta_N(\xi)}}$$

and $\mu_0 \triangleq \mu_0 \sqrt{K}$ with probability 1.

The Fejer kernel $\beta N(x)$ is a periodic function of x. For $d=\lambda/2$, the spatial frequency separation satisfies $|x| \in (0,1/2]$. If $0 < \xi < 1/N$, it holds that $$\beta_N(\xi) = O\left(\frac{1}{\sqrt{N}}\right).$$

Increasing the number of sub-array elements N will decrease the matrix coherence $\mu_0$. In the limit w.r.t. N, it holds that $$\lim_{N \to \infty} \mu_0 = 1,$$

which is its smallest possible value.

Identifiability of Full Array Via Matrix Completion

In this section is discussed SLA topologies that can guarantee unique completion of the low-rank Hankel matrix Y.

Figure 2A:
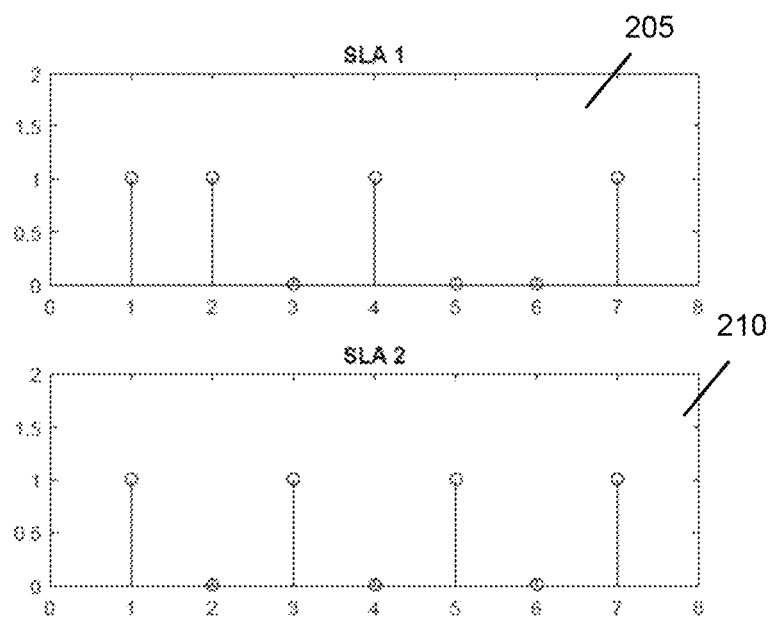
FIG. 2A is an illustration of graphs 205 and 210 of example SLAs.

Consider the two SLA configurations (i.e., the graphs 205 and 210) shown in FIG. 2A. Both SLAs have the same number of array elements and the same aperture size of $3\lambda$. The second SLA (i.e., the graph 210) is a ULA with element spacing of $d=\lambda$. Assume that there is one target at angle $\theta$. Let $$\gamma \triangleq e^{j2\pi \frac{d}{\lambda}\sin(\theta^k)}.$$

The normalized array snapshot of a ULA with aperture size of $3\lambda$ is $y=[1, \gamma, \gamma^2, \gamma^3, \gamma^4, \gamma^5, \gamma^6]^T$. The array snapshots of the two SLAs are $y_1=[1, \gamma, *, \gamma^3, *, *, \gamma^6]^T$ and $y_2=[1, *, \gamma^2, *, \gamma^4, *, \gamma^6]^T$, where * denotes the missing elements. Under the above two different SLAs. The Hankel matrices with missing elements are:

$$Y_1 = \begin{bmatrix} 1 & \gamma & * & \gamma^3 \\ \gamma & * & \gamma^3 & * \\ * & \gamma^3 & * & * \\ \gamma^3 & * & * & \gamma^5 \end{bmatrix}, Y_2 = \begin{bmatrix} 1 & * & \gamma^2 & * \\ * & \gamma^2 & * & \gamma^4 \\ \gamma^2 & * & \gamma^4 & * \\ * & \gamma^4 & * & \gamma^6 \end{bmatrix}$$

Matrix Y is rank one and it can be reconstructed from $Y_1$ uniquely. However, there would be infinite completions of Y from $Y_2$. In a ULA with element spacing $d=\lambda$, there is angle ambiguity which cannot be mitigated via the matrix completion approach.

Figure 2B:
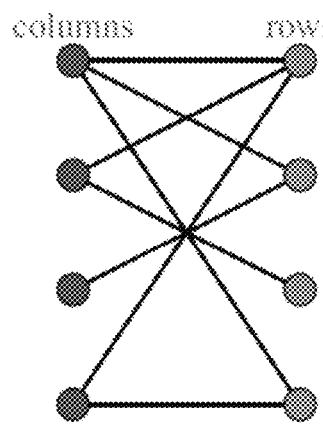
FIGS. 2B and 2C are bipartite graphs corresponding to the SLAs of FIG. 2A.
Figure 2C:
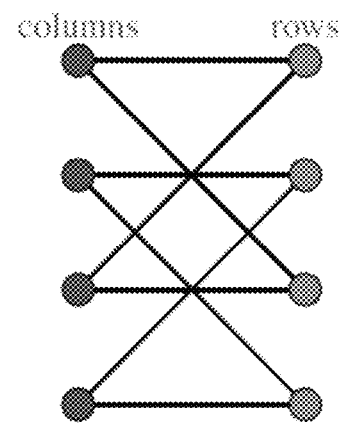

Let $G=(V,E)$ be a bipartite graph associated with the sampling operator $P_\Omega$, where $V=\{1, 2, \ldots, N\} \cup \{1, 2, \ldots, N\}$ and $(i,j) \in E$ iff $(i,j) \in \Omega$. Let $G \in \mathbb{R}^{N \times N}$ be the biadjacency matrix of the bipartite graph G with $G_{ij}=1$ iff $(i,j) \in \Omega$. Note that $P_\Omega(Y)=Y \odot G$, where $\odot$ denotes the Hadamard product. The two bipartite graphs, $G_1$ and $G_2$ associated with the two SLAs are shown in FIG. 2, respectively. It can be seen that $G_1$ is connected, while $G_2$ is not. For a unique reconstruction of Y, the graph must be connected.

The recoverability of a low rank matrix can also be characterized by the spectral gap of graph G, which is defined as the difference between the first two largest singular values of G. If the spectral gap of matrix G is sufficient large, the nuclear norm minimization method defined in (4) exactly recovers the low-rank matrix satisfying the conditions (A1) and (A2). It can be verified that $G_2$ is a 2-regular graph with $\sigma_1(G)=\sigma_2(G)=2$. Thus, the spectral gap of $G_2$ is zero and Y cannot be recovered from $Y_2$.

Let $G_{K+1,K+1}^{-1}$ denote the complete bipartite graph with $(K+1)\times(K+1)$ vertices minus one edge. The graph G is called a K-closed bipartite graph, if G does not contain a vertex set whose induced subgraph is isomorphic to $G_{K+1,K+1}^{-1}$. In general, a rank-K matrix can be uniquely completed only if the bipartite graph G associated with the sampling is K-closable. If Ω is generated from a d-regular graph G with sufficient large spectra gap, and $d \geq 36C^2\mu_0^2K^{-2}$, then the nuclear norm optimization of (4) exactly recover the low-rank matrix, where C is a constant. It can be seen that if the coherence of Y, i.e. $\mu_0$ defined in Theorem 1 is low, the required number of observation samples or array elements of SLA is less.

Numerical Results

Consider an automotive radar setup of FIG. 1 with FMCW transmit waveforms of bandwidth B=350 MHz, corresponding to range resolution of ΔR=0.43 meters. For one coherent processing, a total of 512 FMCW chirps are transmitted, with chirp duration of T=28 μs.

Consider two stationary targets at range of 35 meter with DOA of $\theta_1=10°$ and $\theta_2=20°$. The SNR of the beat signal is set as 0 dB. To estimate the range and Doppler of the targets, a range FFT of length 256 and a Doppler FFT of length 512 are implemented on the sampled beat signal for all 48 channels. The 2 FFT operations (range FFT followed by Doppler FFT) not only help separate targets in the range-Doppler domains, but also provide an SNR improvement in the array response of around 51 dB corresponding to the same range-Doppler bin.

The SLA shown in FIG. 1 acts as a deterministic sampler of a rank-2 Hankel matrix $Y \in \mathbb{C}^{N \times N}$ with N=60, which is constructed based on the array response of a ULA with 119 elements. The array response of the SLA is normalized by its first element. Based on the observed SLA response, the Hankel matrix Y is completed via the singular value thresholding (SVT) algorithm. Let Ŷ denote the completed Hankel matrix. The full ULA response can be reconstructed by taking the average of the anti-diagonal elements of matrix?. The completed full array has aperture size of 59λ. Intuitively, in this simulation setting, matrix completion contributes around 10 log 10(119/48)=3.94 dB SNR improvement for array processing.

Figure 3:
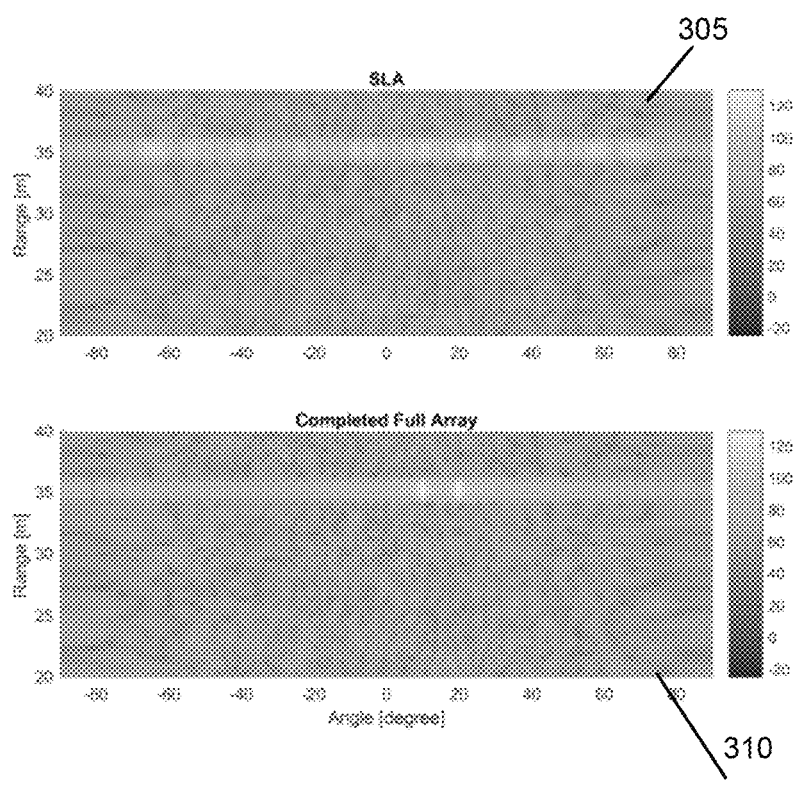
FIG. 3 is an illustration of a graph 305 of a range angle spectrum of a stationary target at a range of 35 m with an angles of $\theta_1=10°$ and a graph 310 of a range angle spectrum of a stationary target at a range of 35 m with an angle of $\theta_2=20°$.
Figure 4:
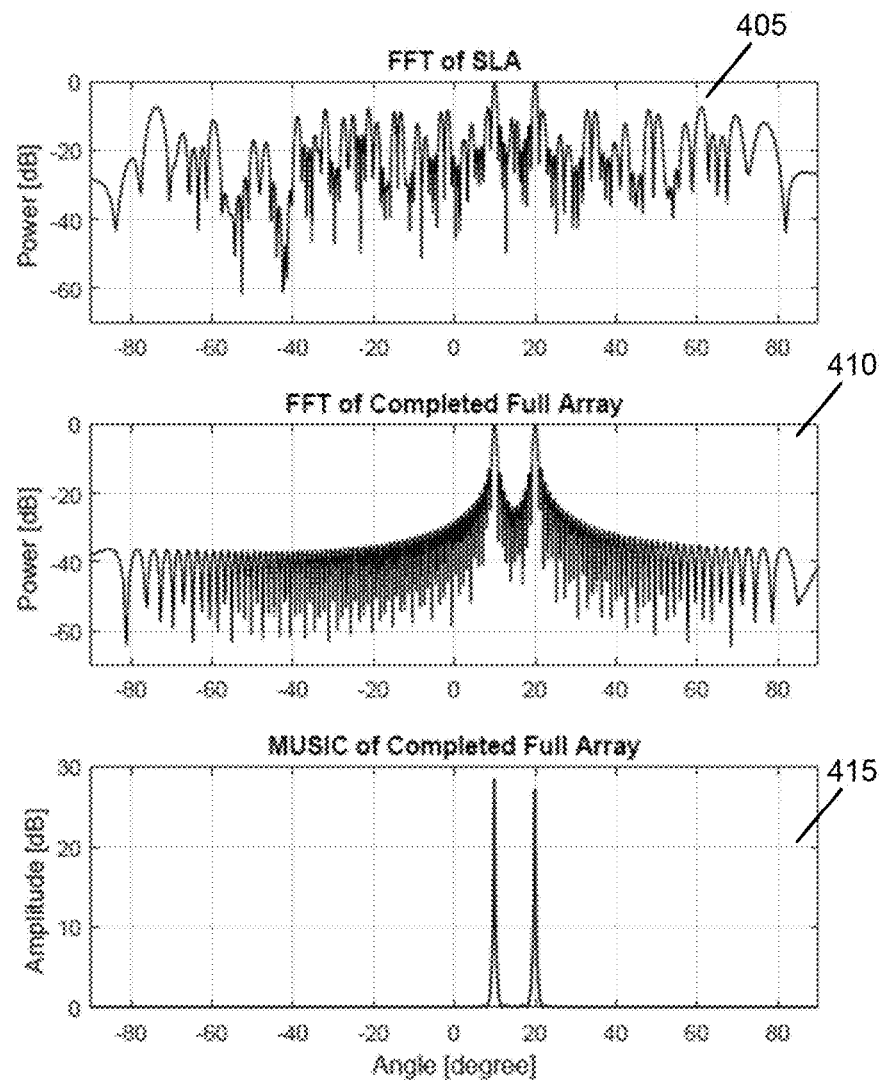
FIG. 4 is an illustration of a graph 405, 410, and 415 showing comparisons of the original SLA using FFT, and the completed full array using FFT and MUSIC pseudo spectrum of the array snapshot.

In FIG. 3, the range angle spectrum for the two stationary targets is plotted as the graph 305 and the graph 310. The two azimuth angle spectra are obtained by applying an FFT to the original SLA with the holes filled with zeros, and the full array completed via matrix completion, respectively. It can be found that it is difficult to detect the two targets in azimuth directions under the original SLA due to its high grating lobes. On the contrary, there are two clear peaks corresponding to correct range and azimuth locations in the range angle spectrum of the completed full array. The comparison of SLA and the completed full array via FFT and MUSIC is shown in FIG. 4. With spatial smoothing, the completed full array is divided into overlapped subarrays of length N=60 and a covariance matrix $R \in \mathbb{C}^{N \times N}$ is formulated. The MUSIC algorithm is then applied to R. It can be found that FFT of SLA generates two peaks corresponding to the correct azimuth directions at a cost of high grating lobes, which are suppressed under the completed full array. The MUSIC pseudo spectrum based on the completed full array response yields sharp peaks corresponding to the correct azimuth directions.

EXAMPLE EMBODIMENTS

Figure 5:
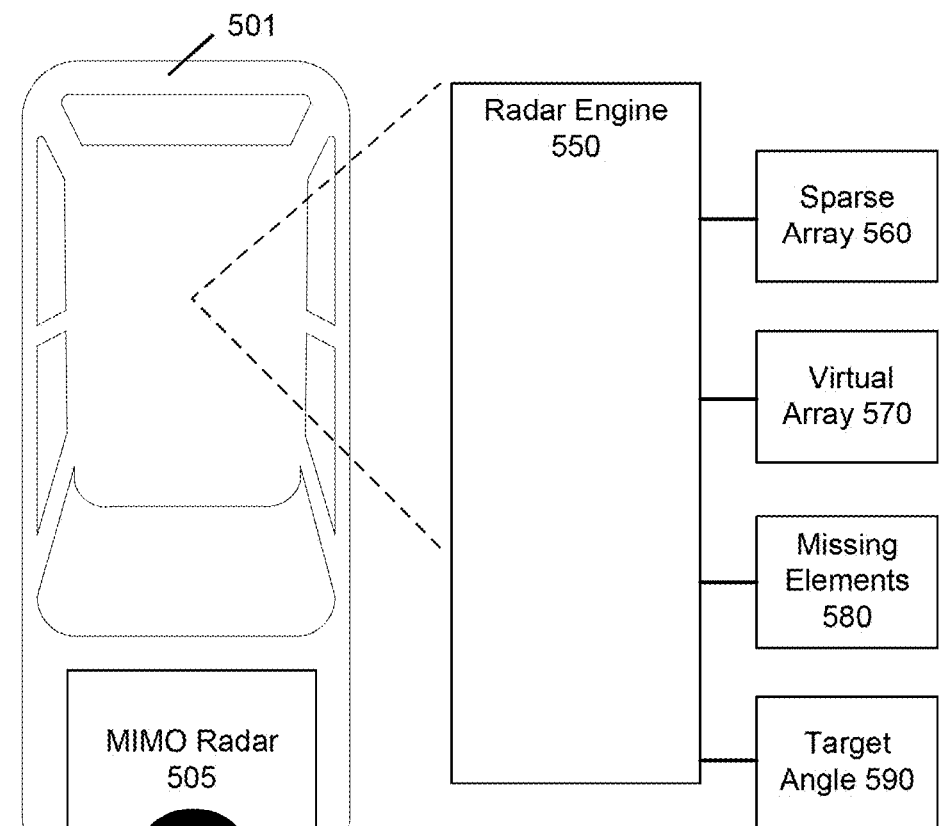
FIG. 5 is an illustration of an example environment 500 for using measurements generated from a sparce linear array.

FIG. 5 is an illustration of of an example environment 500 for using measurements generated from a sparce linear array. As shown, the environment 500 includes a vehicle 501 equipped with a MIMO radar 505. The MIMO radar 505 may have some number of receive and transmit antennas. The MIMO Radar 505 may be used by the vehicle 501 to perform one or more functions such as navigation or collision avoidance.

The MIMO radar 505 may use the transmit antennas to generate a frequency modulated continuous wave ("FMCW") waveform 501. The waveform 501 may be directed away from the vehicle 501 and may be used to determine the distance and angle (e.g., target angle 590) of a target 540 with respect to the vehicle 501. The distance and target angle 590 may be used by the vehicle 501 to either avoid the target 540 or to alert a driver of the vehicle 501 to the presence of the target 540.

To improve the performance of the MIMO radar 505, in some embodiments, the vehicle 501 may include a radar engine 550. The radar engine 550 may be implemented using a general purpose computing device such as the computing device 700 illustrated with respect to FIG. 7.

The radar engine 550 may initially receive what is referred to herein as a sparse array 560. The sparse array 560 may include a value for each of the receive antennas of the MIMO radar 505. In some embodiments, each value may be a signal strength for a portion of the FMCW waveform 501 that was received by the corresponding antennae of the MIMO radar 505.

As described above, the values of the sparse array 560 may be used by the radar engine 550 to generate a virtual array 570. The virtual array 570 may have more values than the sparse array 560 and may include values from the sparse array 560 that correspond to the actual or real antennas of the MIMO radar 505, as well as values for virtual antennas that are not physically part of the MIMO radar 505. The values of the virtual array 570 that correspond to the virtual antennas are referred to as the missing elements 580. As may be appreciated, by using virtual antenna in addition to the real or actual antenna, the performance of the MIMI radar 505 may be increased without realizing the cost and size increase associated with increasing the number of antennae of the MIMO radar 505.

In some embodiments, the radar engine 550 may calculate the values using matrix completion on the sparse array 560. More specifically, the radar engine 550 may calculate the missing values by completing a Hankel matrix as described previously. A Hankel matrix is a matrix having constant values along its antidiagonals.

After completing the missing elements 580 of the virtual array 570, the radar engine 550 may use the virtual array 570 to provide navigation services to the vehicle 501. For example, the radar engine 550 may use the values in the virtual array 570 to calculate a target angle 590 between the vehicle 501 and the target 540. The vehicle 501 may then use the target angle 590 to avoid hitting the target 540 (e.g., steer around the target 540 and/or apply the brakes) or may alert a driver of the vehicle 501 about the target 540.

Figure 6:
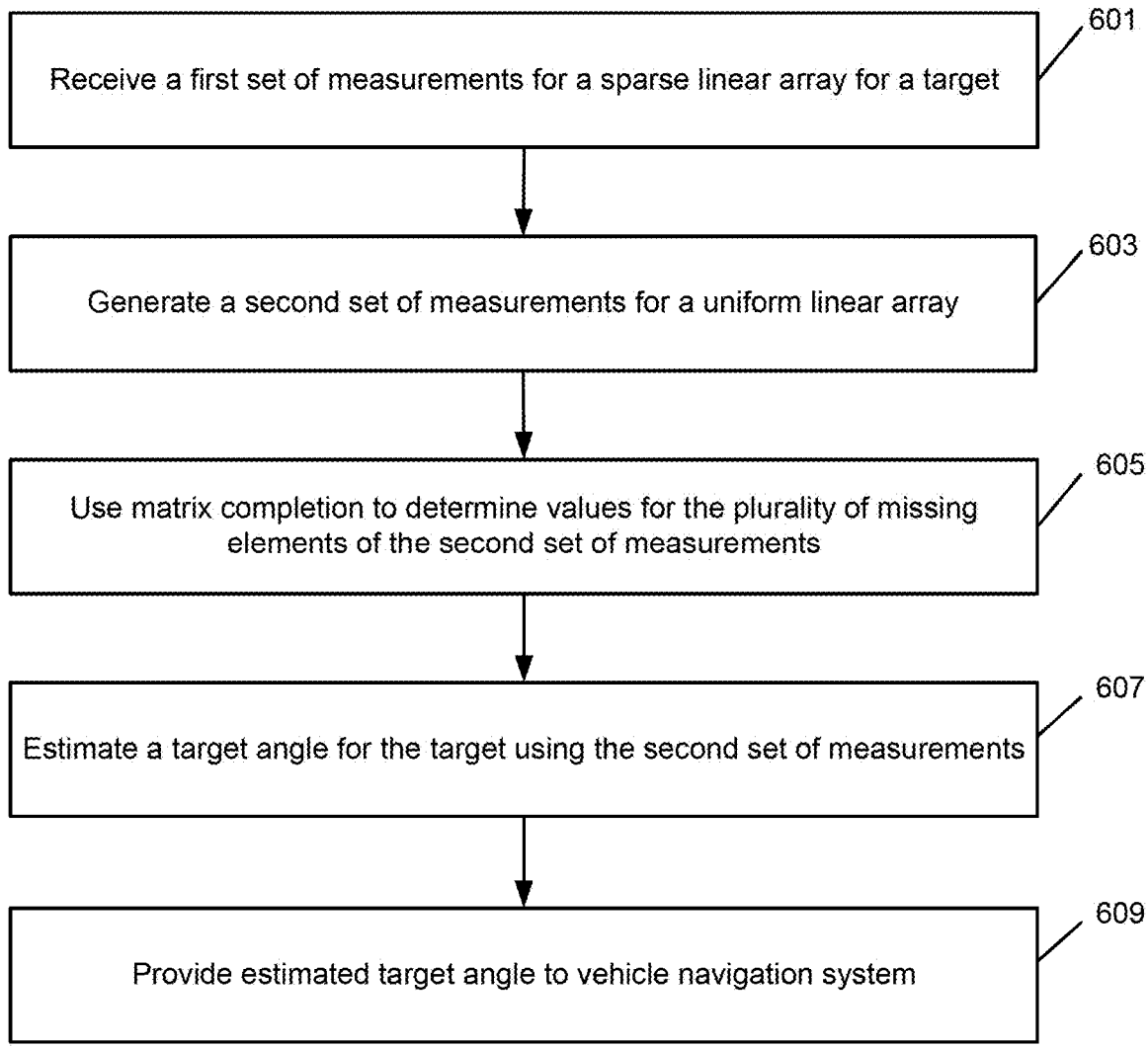
FIG. 6 is an illustration of an example method for completing measurements for a uniform linear array from measurements from a sparse linear array.

FIG. 6 is an illustration of an example method 600 for completing measurements for a uniform linear array from measurements from a sparse linear array. The method 600 may be completed by the radar engine 550 of FIG. 5.

At 601, a first set of measurement for a sparse linear array are received. The measurements in the first set of measurements may be RADAR measurements received from a MIMO RADAR. Each measurement may correspond to an antennae of the sparse linear array. The sparse linear array may have fewer antennas than a corresponding virtual uniform linear array.

At 603, a second set of measurements is generated. The second set of measurements may be generated from the first set of measurements by the computing device 700. The second set of measurements may be for the virtual linear array. Because the virtual uniform linear array has more antennas than the sparse linear array, the second set of measurements may have a plurality of missing elements.

At 605, matrix completion is used to determine values for the plurality of missing elements. The matrix completion may be performed by the computing device 600. Depending on the embodiment, the matrix completion may include completing a Hankel matrix using the first set of measurements. Other methods for matrix completion may be used.

At 607, the second set of measurements are used to estimate a target angle. The target angle may be estimated by the computing device 600 using the second set of measurements. The second set of measurements may have been completed using matrix completion.

Figure 7:
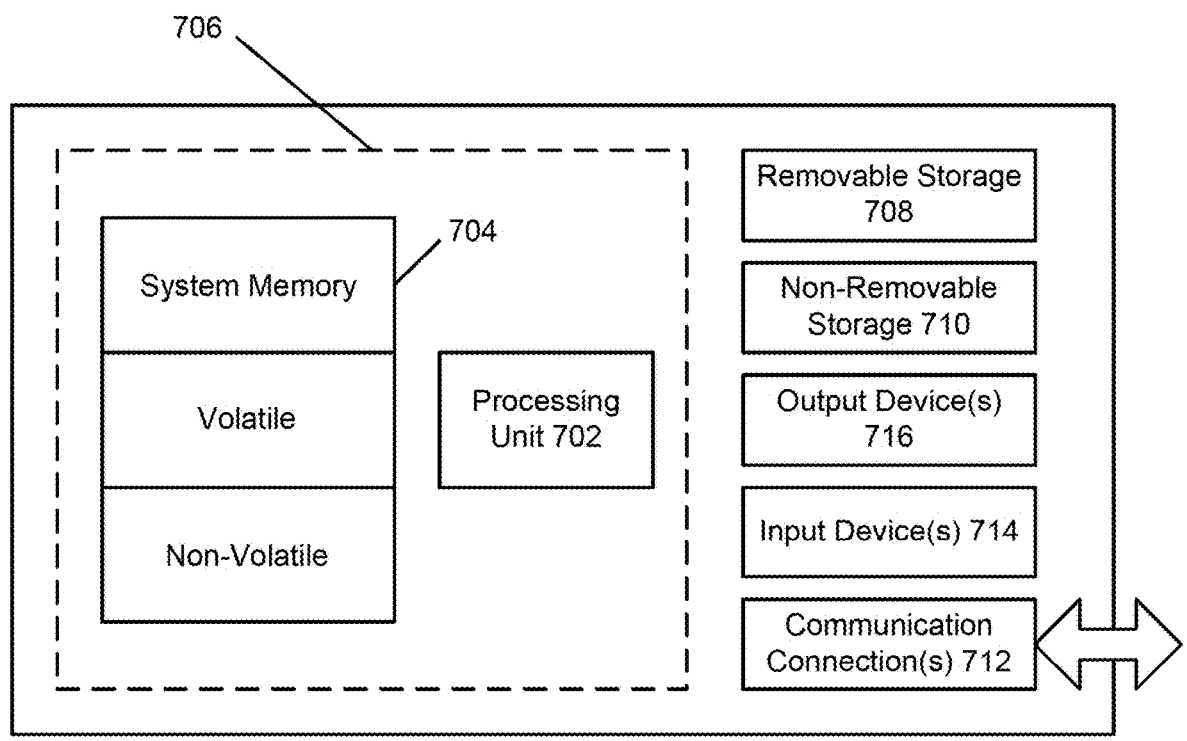
FIG. 7 shows an exemplary computing environment in which example embodiments and aspects may be implemented.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for completing measurements for a uniform linear array from measurements from a sparse linear array in a vehicle comprising:

receiving a first set of measurements for a sparse linear array by a computing device of a vehicle from a MIMO radar associated with the vehicle;

generating a second set of measurements for a uniform linear array from the first set of measurements by the computing device of the vehicle, wherein the second set of measurements has a plurality of missing elements;

constructing a Hankel matrix using the uniform linear array by the computing device of the vehicle; and using the Hankel matrix to determine values for the plurality of missing elements of the generated second set of measurements for the uniform linear array by the computing device of the vehicle.

2. The method of claim 1, further comprising estimating a target angle using the generated second set of measurements.

3. The method of claim 2, further comprising providing the estimated target angle to a vehicle navigation system.

4. The method of claim 1, wherein the second set of measurements has more measurements than the first set of measurements.

5. A system for completing measurements for a uniform linear array from measurements from a sparse linear array comprising:

at least one computing device; and a memory storing instructions that when executed by the at least one computing device cause the at least one computing device to:

receive a first set of measurements for a sparse linear array;

generate a second set of measurements for a uniform linear array from the first set of measurements, wherein the second set of measurements has a plurality of missing elements;

construct a Hankel matrix using the uniform linear array; and use the Hankel matrix to determine values for the plurality of missing elements of the generated second set of measurements for the uniform linear array.

6. The system of claim 5, further comprising estimating a target angle using the generated second set of measurements.

7. The system of claim 6, further comprising providing the estimated target angle to a vehicle navigation system.

8. The system of claim 5, wherein the second set of measurements has more measurements than the first set of measurements.

9. The system of claim 5, wherein the first set of measurements are received from a MIMO radar.

10. The system of claim 9, wherein the MIMO radar is associated with a vehicle.

11. A non-transitory computer readable medium storing instructions that when executed by at least one computing device causes the at least one computing device to:

receive a first set of measurements for a sparse linear array;

generate a second set of measurements for a uniform linear array from the first set of measurements, wherein the second set of measurements has a plurality of missing elements;

construct a Hankel matrix using the uniform linear array; and use the Hankel matrix to determine values for the plurality of missing elements of the generated second set of measurements for the uniform linear array.

12. The computer readable medium of claim 11, further comprising estimating a target angle using the generated second set of measurements.

13. The computer readable medium of claim 11, wherein the second set of measurements has more measurements than the first set of measurements.

14. The computer readable medium of claim 11, wherein the first set of measurements are received from a MIMO radar.

15. The computer readable medium of claim 14, wherein the MIMO radar is associated with a vehicle.

* * * * *